(12) United States Patent
Brodsky et al.

(10) Patent No.: US 7,587,142 B1
(45) Date of Patent: Sep. 8, 2009

(54) METHOD FOR ESTIMATING THE POLARIZATION MODE DISPERSION COMPLIANT CAPACITY FRACTION OF THE TOTAL OPTICAL FREQUENCY TRANSMISSION WINDOW OF A TRANSPORT SYSTEM

(75) Inventors: Mikhail Brodsky, Millburn, NJ (US); Mikhail Boroditsky, South Amboy, NJ (US); Nicholas Frigo, Annapolis, MD (US); Peter David Magill, Freehold, NJ (US)

(73) Assignee: AT&T Intellectual Property II, LP, Reno, NV (US)

( * ) Notice: Subject to any disclaimer, the term of this patent is extended or adjusted under 35 U.S.C. 154(b) by 470 days.

(21) Appl. No.: 11/321,427

(22) Filed: Dec. 29, 2005

(51) Int. Cl.
*H04B 10/00* (2006.01)
(52) U.S. Cl. ...................................... 398/152; 398/158
(58) Field of Classification Search .............. 398/152, 398/158, 159; 359/483, 484, 485, 494, 497, 359/499; 358/11
See application file for complete search history.

(56) References Cited

U.S. PATENT DOCUMENTS

2003/0095313 A1* 5/2003 Menikoff et al. ............ 359/161

OTHER PUBLICATIONS

Christopher T. Allen et al. "Measured Temporal and Spectral PMD Characteristics and their Implications for Network Level Mitigations Approaches", Journal of Lightwave Technology, vol. 21, No. 1, Jan. 2003, pp. 79-86.*
Statistics of the DGD in PMD Emulators, Cristian Antonelli, et al.; IEEE Photonics Technology Letters, vol. 16, No. 8, Aug. 2004, pp. 1840-1842.
Physical Mechanism For Polarization Mode Dispersion Temporal Dynamics, Misha Brodsky, et al.; Industry Research Highlights; IEEE Leos Newsletter, Jun. 2004, pp. 4-6.
Measured Temporal and Spectral PMD Characteristics and Their Implications for Network-Level Mitigation Approaches, Christopher T. Allen, et al., Journal of Lightwave Technology, vol. 21, No. 1, Jan. 2003, pp. 79-86.
Polarization-Mode Dispersion of Installed Recent Vintage Fiber as a Parametric Function of Temperature; Misha Brodsky, et al., IEEE Photonics Technology Letters, vol. 16, No. 1, Jan. 2004, pp. 209-211.
Field PMD Measurements through a Commercial, Raman-Amplified ULH Transmission System; Misha Brodsky, et al., Proc. LEOS PMD Summer Topical Meeting, 2003, pp. 15-16, paper MB3.3.
Long-Term Measurement of PMD and Polarization Drift in Installed Fibers, Magnus Karlsson, et al., Journal of Lightwave Technology, vol. 18, No. 7, Jul. 2000, pp. 941-951.

(Continued)

*Primary Examiner*—M. R. Sedighian

(57) ABSTRACT

A method and system for estimating a fraction of an optical transmission system's transmission window that is compliant with the system's polarization mode dispersion (PMD) outage specifications, the optical transmission system including $N_s$ optical fiber segments. The method comprises the steps of: propagating a plurality of optical signals through the $N_s$ optical fiber segments; monitoring the differential group delay (DGD) for each optical signal over time; computing a time average and variance of the monitored DGD for each optical signal; computing statistics of the time averages and variances of the monitored DGD for each optical signal; determining the number of effective PMD sections and effective hinges in the system from the statistics; and determining the size of a PMD capacity compliant fraction for a specified outage probability.

4 Claims, 11 Drawing Sheets

OTHER PUBLICATIONS

Measured Temporal and Spectral PMD Characteristics and Their Implications for Network Level Mitigation Approaches, Christopher T. Allen, et al., Journal of Lightwave Technology, vol. 21, No. 1, Jan. 2003, pp. 79-86.

Long Term Measurement of PMD and Polarization Drift in Installed Fibers, Magnus Karlsson, et al., Journal of Lightwave Technology, vol. 18, No. 7, Jul. 2000, pp. 941-951.

In-Service Measurements of Polarization-Mode Dispersion and Correlation to Bit-Error Rate, Misha Boroditsky, et al., IEEE Photonics Technology Letters, vol. 15, No. 4, Apr. 2003, pp. 572-574.

Evidence for Parametric Dependence of PMD on Temperature in Installed 0.05 ps/km$^{frax;1;2}$ Fiber, Misha Brodsky, et al., Proc. ECOC, 2002, vol. 4, Paper 9.3.2.

PMD and Coherence Measurement, Paul Westbrook, vol. 1, OFC 2003, Tuesday Afternoon, pp. 224-225.

* cited by examiner

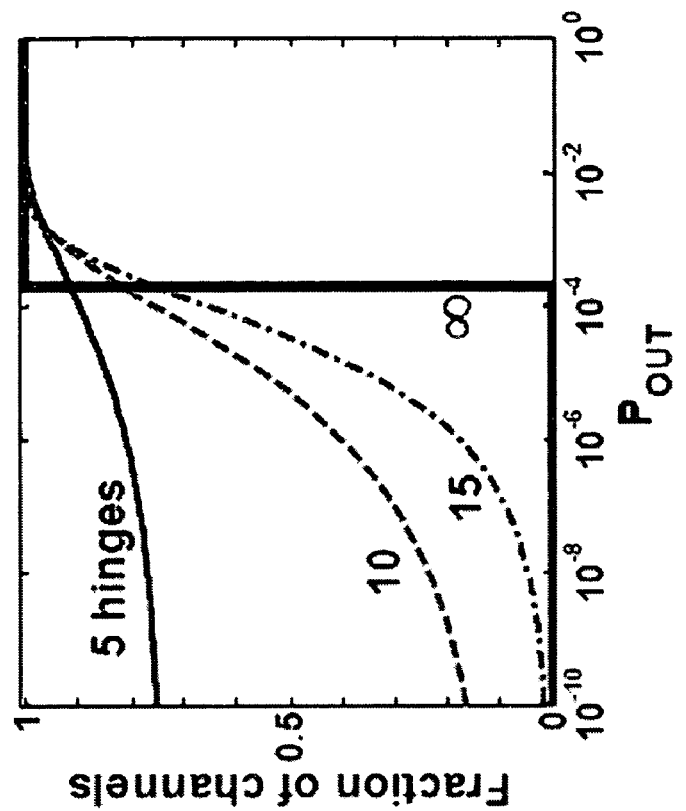
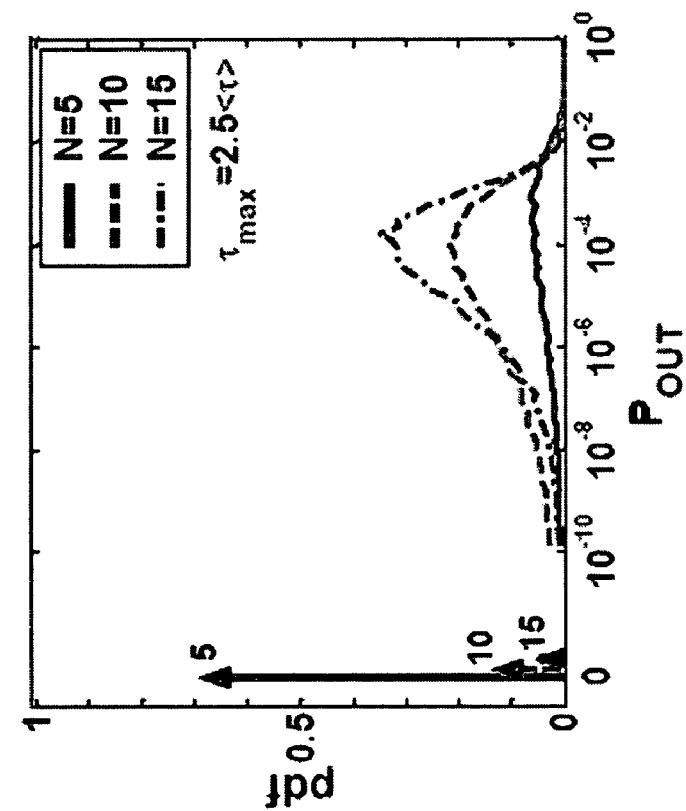
Fig. 6a
Fig. 6b

METHOD FOR ESTIMATING THE POLARIZATION MODE DISPERSION COMPLIANT CAPACITY FRACTION OF THE TOTAL OPTICAL FREQUENCY TRANSMISSION WINDOW OF A TRANSPORT SYSTEM

BACKGROUND OF THE INVENTION

The present invention generally to optical communications, and more particularly, to a system and method for determining how much of the optical spectrum of a given transmission link can be used to provision wavelengths without the need for polarization mode dispersion (PMD) compensation.

Optical communications have revolutionized the telecommunications industry in recent years. The fiber optic medium provides the ability to efficiently transmit high bit rate signals through a low-loss medium. The development of modern high bandwidth techniques, and wavelength division multiplexing (WDM) to permit the simultaneous transmission of multiple high bandwidth channels on respective wavelengths, has enabled a tremendous increase in communications capacity. The last decade has been seen efforts to increase capacity by taking advantage of the fiber optic medium to the maximum extent possible.

Signals transmitted through an optical medium can be affected by PMD, which is a form of signal distortion that can be caused by subtle physical imperfections in the optical fiber. In principle, an optical fiber with a circular core has rotational symmetry, so that there is no preferred direction for the polarization of the light carrying the optical signal. However, during fabrication, jacketing, cabling, and installation, perturbations in the fiber that will distort this symmetry can occur, thereby causing the fiber to "look different" to various optical polarizations. One of the manifestations of this loss of symmetry is "birefringence," or a difference in the index of refraction for light that depends on the light's polarization. Light signals with different polarization states will travel at different velocities. In particular, there will be two states of polarization (SOPs), referred to as the "eigenstates" of polarization corresponding to the asymmetric fiber. These eigenstates form a basis set in a vector space that spans the possible SOPs, and light in these eigenstates travels at different velocities.

A birefringent optical fiber transporting a modulated optical signal can temporally disperse the resulting optical frequencies of the signal. For example, an optical pulse, with a given optical polarization, can be formed to represent a "1" in a digital transmission system. If the signal is communicated through a medium with uniform birefringence (i.e., remaining constant along the length of the fiber), the SOPs can be de-composed into corresponding eigenstates, thereby forming two independent pulses, each traveling at its own particular velocity. The two pulses, each a replica of the original pulse, will thus arrive at different times at the end of the birefringent fiber. This can lead to distortions in the received signal at the end terminal of the system. In this simple illustrative case, the temporal displacement of the two replicas, traveling in the "fast" and "slow" SOPs, grows linearly with distance.

In a typical optical communications system, birefringence is not constant but varies randomly over the length of the transmission medium. Thus, the birefringence, and therefore, the eigenstate, changes with position as the light propagates through the length of the fiber. In addition to intrinsic changes in birefringence resulting from imperfections in the fabrication processes, environmental effects such as, for example, temperature, pressure, vibration, bending, etc., can also affect PMD. These effects can likewise vary along the length of the fiber and can cause additional changes to the birefringence. Thus, light that is in the "fast" SOP in one section of fiber might become be in the "slow" SOP at another section of the fiber. Instead of increasing linearly with distance, the temporal separations in the pulse replicas eventually take on the characteristics of a random walk, and grow with the square root of the distance. Despite the local variations in the fast and slow states, it is understood that when the fiber as a whole is considered, another set of states can be defined that characterize the PMD for the entire fiber and split the propagation of the signal into fast and slow components. These "principal states" can be imaged (in a mathematical sense) back to the input face, and used as an alternative basis set. Thus, an arbitrary launch SOP will have components in each of the principal states, and distortion will result from the replication of the pulses after resolution into principal states and their differential arrival times. While the physical process is described in the foregoing in a "global" as opposed to "local" sense, the basic impairment is the same; distortion results from the time delay introduced in the pulse replicas.

The above discussion relates to "narrowband" signals, i.e., having a narrow enough bandwidth that the optical properties of the fiber can be characterized as operating at a single wavelength. This is commonly referred to as "first order PMD." Birefringence, however, can also vary with wavelength, such that each section of fiber may have slightly different characteristics, both in the magnitude and direction of the birefringence. As a consequence, after a long propagation through an optical medium, light from two neighboring wavelengths initially having the same polarization may experience what looks like a fiber with two different characteristics.

Theoretically, PMD can be represented by a Poincare sphere, or "Stokes' space" representation. In this representation, the equations of motion for SOPs and PMD at a given optical frequency are given by:

$$\partial s/\partial z = \beta \times s \quad (1a)$$

$$\partial s/\partial \omega = \tau \times s \quad (1b)$$

$$\partial \tau/\partial z = \partial \beta/\partial \omega + \beta \times \tau \quad (1c)$$

In these equations (which are in the "representation" space, not "real" space) "β" represents the birefringence of the fiber at position z, "s" represents the SOP of the light at position z, and "τ" represents the PMD. Generally, Eqn. (1a) states that birefringence causes the representation of the SOP to rotate about the "β" axis as light propagates through the fiber. Eqn. (1b) states that, when viewed at a given position (e.g., the fiber output), the system's PMD causes the SOP to rotate about it as a function of optical frequency. In this regard, light launched at a given optical frequency will evolve to an SOP at the output, and if the optical frequency is then changed (but the launch polarization remains the same), the SOP at the output will also begin to rotate about the PMD vector, τ. Eqn (1c) states that the vector characterizing PMD changes along the length of the fiber. The driving term in Eqn (1c), $\beta' = \partial \beta/\partial \omega$, which we refer to as the "specific PMD," describes the relationship of birefringence to optical frequency. Even for the simplest cases, there is usually a non-zero driving term (and thus PMD) for birefringent fibers. Based on the above, the vector s will suffer infinitesimal rotations about the axis defined by β, and that the rotation axis will change as β changes with distance (and parametrically with time). However, the total evolution of s can be represented by a single, finite rotation based upon Euler's theorem. If the signal bandwidth is large enough to experience these variations, it is commonly referred to as "higher order" PMD. Higher order PMD also leads to pulse distortion as the optical bandwidth of the signal increases. As the bandwidth increases, the input signal can be decomposed into Fourier components, with each propagated in accordance with the equations discussed above, and the components collected at the output. In the narrowband context, for illustrative purposes, the "concatenation rule" represented by the above equations states that the PMD of a given section of fiber can be "imaged" to the PMD at the output through the same transformation that governs birefringence. For a fiber consisting of two sections having respective PMDs $\tau_1$ and $\tau_2$, and respective rotations of the SOP via finite rotations $R_1$ and $R_2$, the total PMD can be represented by:

$$\tau = \tau_2 + R_2 \tau_1 \quad (2)$$

This equation states that the final PMD vector is represented by the vectorial sum of the second (i.e. final) section's PMD vector and the first section's PMD vector, but only after that first PMD vector has been rotated by the same rotation operator ($R_2$) that rotates the SOPs propagating at that wavelength. This is shown by noting the rotations by $\beta$ implied in Eqns. 1a and 1c.

A generalization of Eqn. 2 shows that a similar rule applies for a fiber having multiple sections. Thus, each section of length $\Delta z$ can be considered as having it's own uniform primitive PMD vector, $\beta'\Delta z$. The PMD of the entire multi-sectioned fiber can be characterized as a vector sum of the transformed primitive PMDs, one for each section, where each PMD primitive vector is transformed by the concatenated rotation of all the sections between it and the output. Since each of these constituent vectors is only a transformed version of its corresponding primitive PMD vector, each has the same length as its primitive vector, but effectively suffers a random rotation (the Euler's theorem equivalent of the concatenated rotations between the section and the output). This process is illustrated in FIG. 1, where for an arbitrary optical frequency $\omega_0$, the fiber (hereinafter, the optical fiber will be referred to as optical fiber) 100 is segregated into five independent sections (i.e., A, B, C, D, E), where each section's PMD is represented by a vector (row 102) directly below that section, and these PMD vectors represent a random distribution in magnitude and direction for the respective sections of the optical fiber. Each section's PMD vector (except the last one's) is imaged to the end and is shown on the right side of the figure (at 106) as a primed version of the original. Thus, the PMD vector for section B is propagated through sections C, D, and E, resulting in its output image, vector B'. The PMD for the entire fiber is then computed as the vector sum of these constituents as depicted at 108 in FIG. 1.

Referring now to FIG. 2, the PMD of the same fiber is shown at a slightly different optical frequency, $\omega_0+\Delta\omega$. In this example, in row 202 the PMD for each section at $\omega_0$ (from FIG. 1) is represented by dotted vectors, while the PMD for each section at $\omega_0+\Delta\omega$ is represented by solid vectors. Each primitive vector corresponding to this neighboring frequency ($\omega_0+\Delta\omega$) is slightly different than the primitive vector for the original frequency $\omega_0$. This, by itself, results in a slightly different sum for the total PMD vector at $\omega_0+\Delta\omega$. However, in addition to slight changes in the primitive vectors, the new optical frequency also causes different rotations in each section, since the birefringence in each section can also be a function of optical frequency. The images for each section are imaged (trajectories 204) to the output at 206, and are slightly different from those depicted in FIG. 1 as shown by the difference at 206 between the solid and dotted arrows. These change more dramatically as the optical frequency changes. In FIG. 2, the total PMD vector 208 at this new optical frequency is shown as a solid arrow, while the PMD vector at $\omega_0$ (from FIG. 1) is depicted as a dotted arrow. Thus, the PMD will change in magnitude and direction as a function of the optical frequency, even though the constituent PMD vectors for the sections may be drawn from the same statistical ensemble representing the fiber's properties. In large part, the study of PMD is a study of the properties of the statistics of the vector sum of these images.

Both the magnitude of the PMD vector, called the "differential group delay" or DGD, and the directions of the unit vectors parallel and anti-parallel to the PMD vector, called the "Principal States of Polarization" (PSPs), change with optical frequency. The principal states are orthogonal and thus are on opposite sides of the sphere. The unit vector is usually associated with the slowest mode. Most frequently, it is the DGD which is plotted in discussions of PMD, but variations in the PSPs with optical frequency also can cause distortion in the optical link. The properties of the PMD are therefore going to follow the statistics of the sum of a set of vectors from the sections of the fiber that are chosen from a distribution and then, for the most part, randomly rotated after propagation through the fiber before being summed.

It has been shown through experiments and simulations that differential group delay (DGD) statistics across channels is well approximated by a Maxwell distribution, resulting from many degrees of freedom. It is often assumed that the same statistics hold for every individual frequency, or channel, in a fiber if observed for a sufficient time, over which different paths of a 3-d random walk are realized. While this may be true for extremely long timescales such timescales may not be relevant compared to the duration of system operation. Nonetheless, at present the mean PMD of fiber routes is often chosen so that the probability of exceeding some maximally allowed DGD value is less than $10^{-5}$ with an assumption of Maxwellian statistics.

Many recent experimental studies on PMD were devoted to its temporal dynamics. There seems to be general agreement that in relatively short (<100 km) buried routes, the PMD changes only insignificantly over weeks and even months, essentially remaining 'frozen' over these timescales. At the same time significant variations of PMD have been observed in longer amplified routes, consisting of multiple buried fiber spans. These PMD variations are attributed to polarization rotations in the amplifier huts due to indoor temperature variation. Dispersion compensating modules, for example, were found to produce a full rotation in Stokes space when heated by 1-2° C.

More recent experimental data analysis shows that individual channels in a long system have strikingly different DGD statistics, with the mean DGD and its standard deviation varying by a factor of two across wavelength. Moreover, we see evidence linking these differences to the number of rotation points, or 'hinges' (such as the number of amplifier huts and bridges) in the system. These findings have significant implications for the statistics of system outages.

SUMMARY OF THE INVENTION

Aspects of the present invention provide a method and system for estimating a fraction of an optical transmission system's transmission window that is compliant with the system's polarization mode dispersion (PMD) specifications in an optical transmission system including $N_s$ optical fiber segments. The method comprises the steps of: propagating a plurality of optical signals through the $N_s$ optical fiber segments; monitoring the differential group delay (DGD) for each optical signal over time; computing a time average and variance of the monitored DGD for each optical signal; computing statistics of the time averages and variances of the monitored DGD for each optical signal; determining the number of effective PMD sections and effective hinges in the system from the statistics; and determining the size of a PMD capacity compliant fraction for a specified outage probability.

Other features and advantage of the present invention are described below are apparent from the accompanying drawings and from the detailed description which follows.

BRIEF DESCRIPTION OF THE DRAWINGS

The invention is described in detail with regard to the following figures, wherein like numbers reference like elements, and wherein:

FIG. 6a is a graph of the distribution of the outage probability among optical channels in an optical system with a common maximum DGD value of $\tau_{max}=2.5\,\tau_{rms}$ and for different numbers of polarization rotators (hinges);

FIG. 6b is a graph showing the outage probability vs. fraction of channels as a function of the number of hinges (cumulative probability);

DETAILED DESCRIPTION OF PREFERRED EMBODIMENTS

As an optical carrier of a given wavelength is modulated according to a particular scheme, the resulting optical signal can be characterized as a narrow spectrum of frequencies centered on the carrier wavelength. For example, an optical carrier having a wavelength of 1550 nm (nanometers) can be modulated by On-Off Keying (OOK) at technique bitrate of 10 Gb/s to produce an optical signal having a spectrum of approximately 1550±0.1 nm. As such optical signals are transported by birefringent optical fibers, the optical fibers can distort the optical signals due to polarization mode dispersion (PMD).

PMD effects are often considered as a Taylor's series, commonly referred to as first- and higher-order PMD. First-order PMD refers to the depolarization and time dispersal of various polarization components of an optical signal that is essentially constant for all frequencies in a narrow band of optical frequencies. That is, for a high-speed data signal modulated on an optical carrier, the resulting band of optical frequencies will be dispersed in a uniform manner independent of frequency, i.e., multiple images, or echoes, of a transmitted optical signal can appear at a receiver. Higher-order PMD refers to temporal dispersal that, unlike first-order PMD, varies as a function of frequency, i.e., components of an optical signal having a particular frequency can be delayed and depolarized relative to the rest of the optical signal.

As various techniques are developed to transport increasing numbers of optical signals having different wavelengths through a single optical fiber, it should be appreciated that each optical signal is subject to PMD. While optical transmission systems are generally designed to exhibit minimal PMD, these systems can slowly deteriorate with time or otherwise change. Once a channel deteriorates, it can stay in a non-functional state for times between several minutes and several hours.

For an optical fiber carrying multiple optical signals centered around different optical frequencies, it should be appreciated that the PMD profile for a particular optical signal can appear quite different from any other PMD profile, despite the fact that each optical signal traverses the same birefringent medium. It should be further appreciated that, as the birefringence of the optical fiber changes due to factors such as fluctuations of temperature and humidity, the PMD profiles for the various optical signals can change in apparently independent and disparate fashions.

Figure 1:
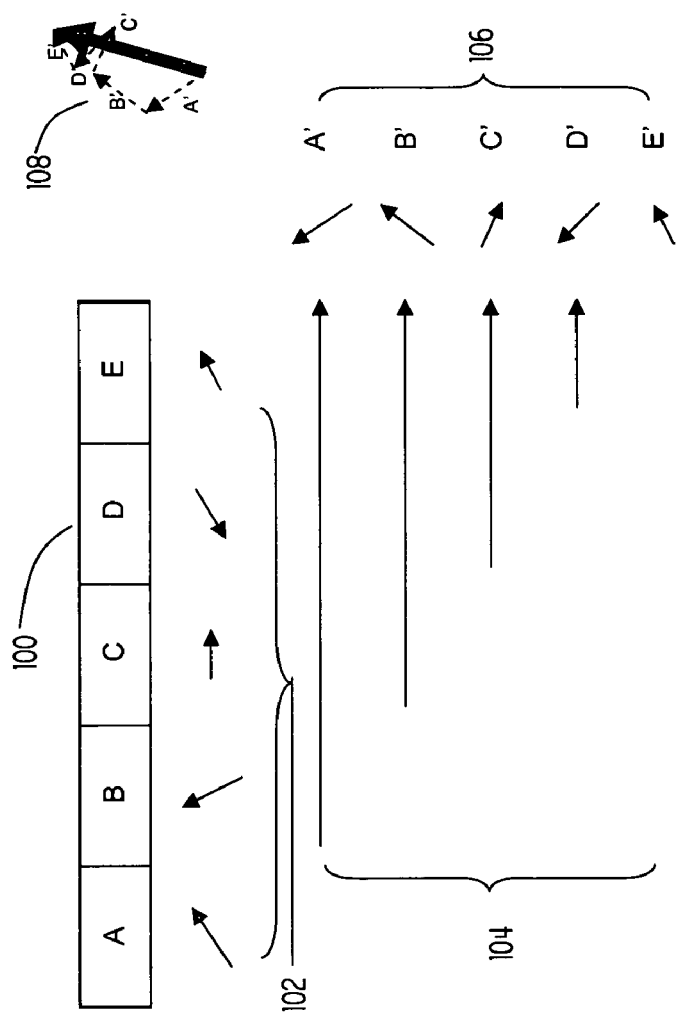
FIG. 1 is a schematic depicting PMD vectors representing a random distribution in magnitude and direction for the respective sections of an optical fiber.
Figure 2:
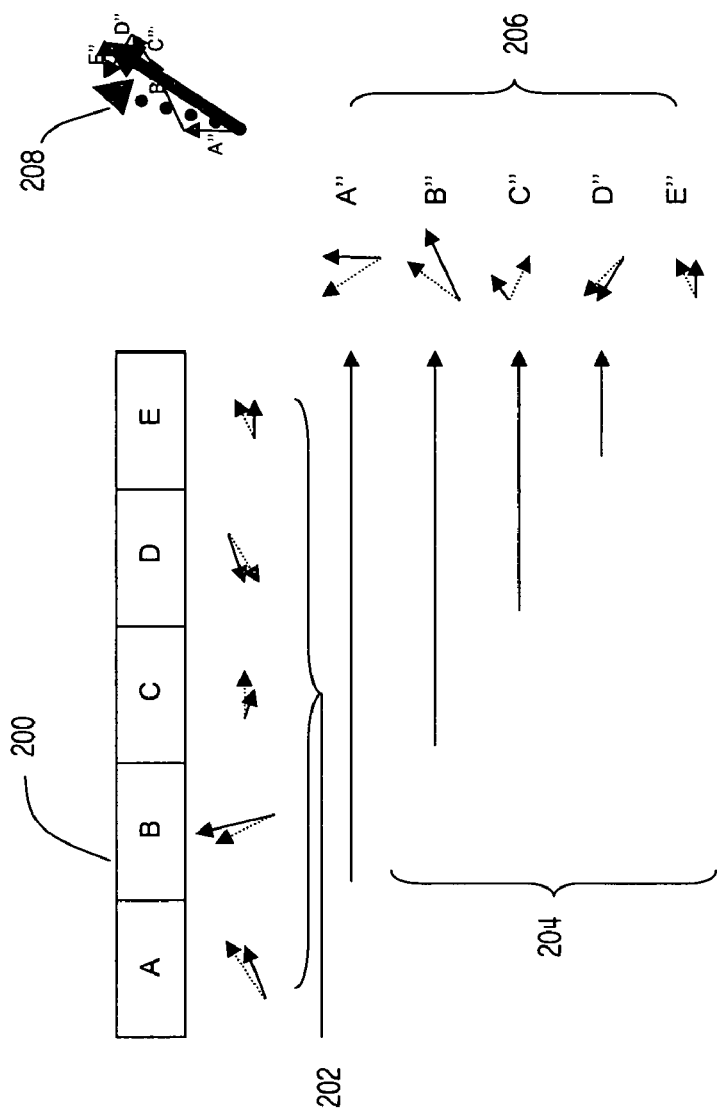
FIG. 2 is a schematic depicting the same fiber conducting an optical signal at a slightly different optical frequency, $\omega_0 + \Delta\omega$.
Figure 3:
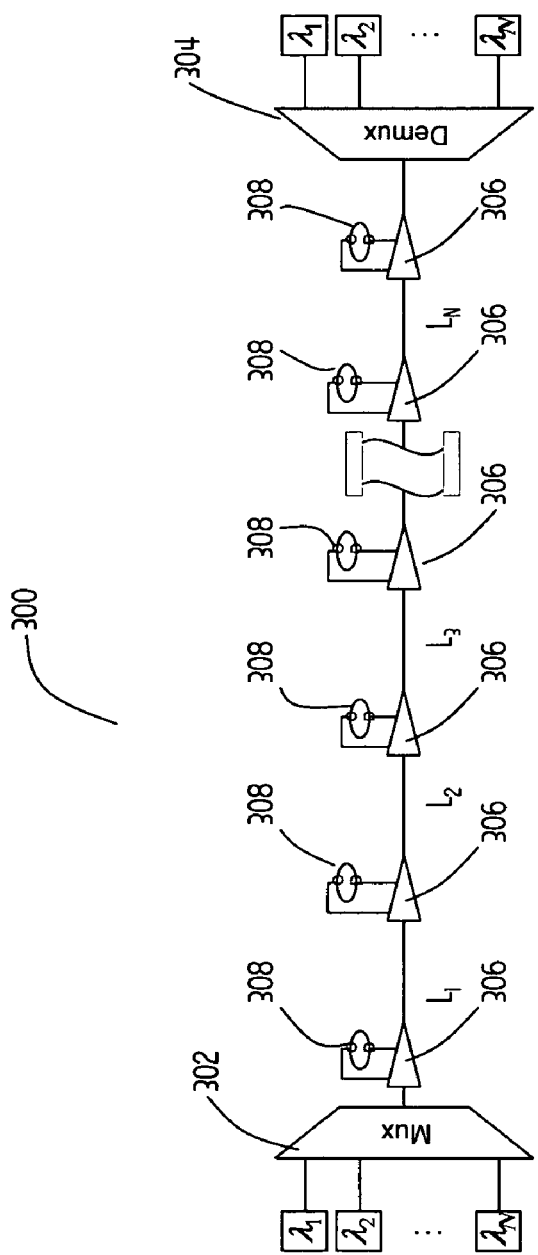
FIG. 3 is a schematic of an exemplary long-haul WDM system segregated into a plurality of birefringent sections, also referred to as "hinges;"

Referring now to FIG. 3, there is depicted an exemplary long-haul WDM system 300 in which a plurality of optical signals having respective wavelengths $\lambda_1, \lambda_2 \ldots \lambda_n$ are multiplexed via multiplexer 302 to an optical fiber 304 that has been segregated into a plurality of spans, i.e., fiber sections $L_1, L_2, L_3, \ldots L_N$. The multiplexed signals are demultiplexed at 305 as is well known in the art. The demultiplexer 305 may include hardware/software for measuring an error condition such as the total number of bit-errors counted in a received optical signal, and for correcting such errors by utilizing, for example, FEC. A plurality of optical amplifiers 306 are disposed at locations defining the terminating ends of each section L. Such amplifiers are generally placed to restore optical signal amplitudes before they have decayed to a level for which noise levels would corrupt the data. These amplifiers require power and are thus at locations in which other equipment (requiring electrical power) can be placed. A chromatic dispersion compensation module 308 is operably coupled to each amplifier 306 to compensate for the effects of chromatic dispersion in the fiber. In many systems today, such compensators are placed mid-span in a multi-stage optical amplifier. Said dispersion compensation modules act, under the influence of small temperature variations, as polarization rotators, or hinges, and change the configuration of the fiber. An additional midspan polarization rotation is coming from the exposed portions of the fiber routes such as manholes and bridge attachments.

Figure 4A:
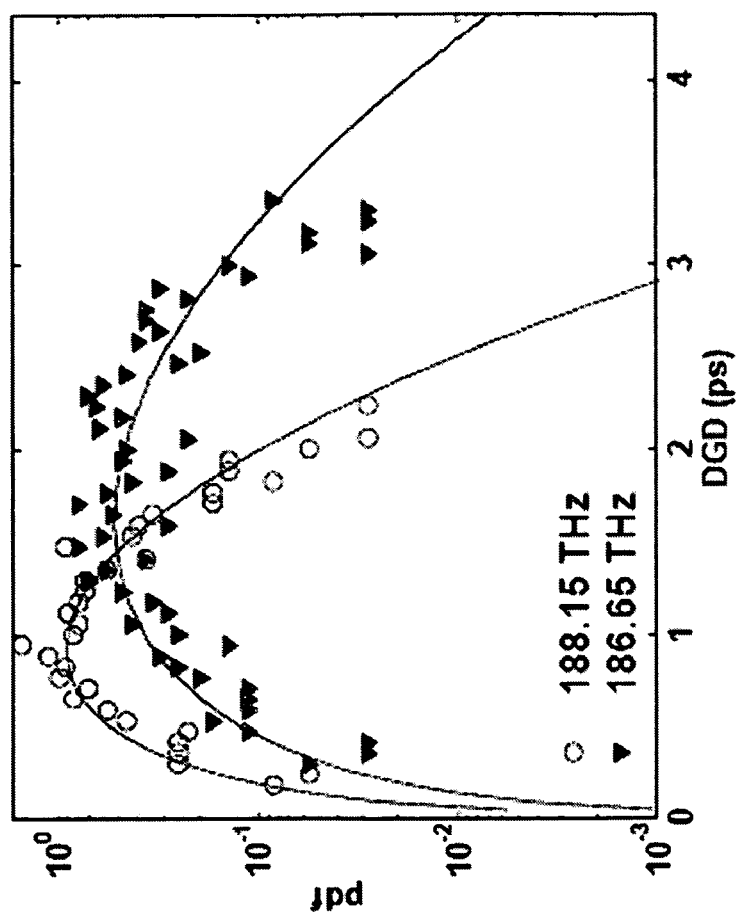
FIG. 4a is a graph of probability density of observed Differential Group Delay for two channels (symbols) together with a fitting Maxwellian distribution with matched means (thin lines)

In accordance with an aspect of the present invention, a methodology is provided for estimating the fraction of a system's transmission window that is compliant with the system's PMD specifications, which generally comprises monitoring Differential Group Delay (DGD) values for several optical frequencies over time, computing the time average of the monitored values for each frequency, computing statistics of the time averaged values over each frequency, and determining the number of effective PMD sections in the system from the statistics and the size of the PMD Compliant Capacity Fraction (CCF) for any specified outage probability. Monitoring the DGD may be accomplished at an optical receiver. Our more recent experimental data analysis show that individual channels in a long system have strikingly different DGD statistics, with the mean DGD and its standard deviation varying by a factor of two across wavelength, as depicted in FIG. 4a. We have also found that the standard deviation of the distribution sampled by each channel, $\sigma_{ch}$, is frequency dependent as well. We have observed similar behavior in every set of DGD measurements with various system configurations, as long as there were temperature variations driving the hinges. When the temperature was stable, the measured DGD did not change appreciably.

Moreover, we see evidence linking these differences to the number of rotation points, or 'hinges' (such as the number of amplifier huts and bridges, see for example, FIG. 3) in the system. These findings have significant implications for the statistics of system outages and we show via simulations that the outage statistics of a system with a finite fixed number of rotation points differs from what one would expect from a truly Maxwellian system. As long as these rotation points remain the only degrees of freedom, every channel has its own outage probability, significantly different from the probabilities expected from a Maxwellian distribution. Moreover, some channels are guaranteed to be outage-free over these times. As discussed below, the variations in outage probability among channels depends strongly on the number of hinges in the system. Namely, the larger the number of hinges, the less the channel-specifying DGD statistics variation.

Figure 4B:
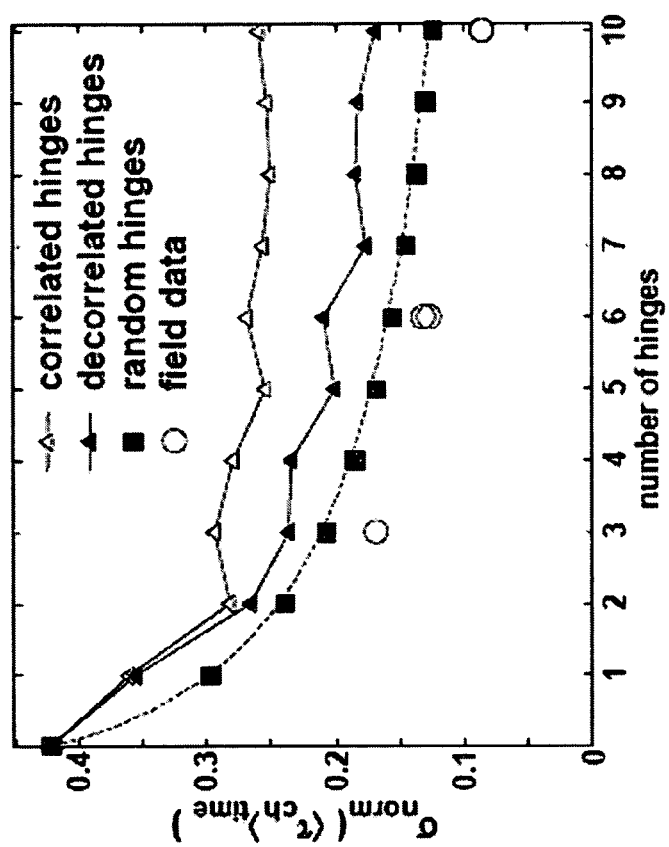
FIG. 4b shows dependence of the normalized standard deviation (in frequency dimesion) of DGD averaged in time: $\sigma_n(<\tau>_{time})$ on the number of hinges for correlated, decorrelated, and completely random hinges.

In fact, we devised the following procedure to estimate the standard deviation of the distribution of samples $<\tau_{ch}>$ time over frequency, namely $\sigma(<\tau_{ch}>_{time})$, as a function of the number of hinges, which is described in detail in Brodsky et al, Optics Express Vol. 12, pp. 4090-4095, 2005, and incorporated by reference herein. For each number of hinges N, we created a set of 100,000 numerical "emulators". Within this set, all emulators had the same fixed number of (N+1) different sections, but each section's DGD was chosen by a random draw from the same Maxwellian distribution. Among 100,000 realizations of an emulator, each is a unique set of (N+1) different sections. It represents one channel or, more precisely, an independent frequency band in our experiment. Over time, we assume that all hinges are exercised, so that the mean DGD value $<\tau_{ch}>$ time could be computed by using an analytical expression for each emulator realization from C. Antonelli and A. Mecozzi, "Statistics of the DGD and PMD emulators," IEEE Photon. Technol. Lett. 16, 1840-1842 (2004), and incorporated by reference herein. Then the normalized standard deviation for the 100,000 emulator realizations $$\sigma_{norm} = \frac{\sigma(\langle\tau\rangle_{time})}{\langle\langle\tau\rangle_{time}\rangle_{freq}}$$

was calculated numerically for each set of N-hinge emulators. Here, averaging in frequency was performed by ensemble averaging over the set of 100,000 emulator realizations. The estimates we obtained for this quantity, σnorm, are plotted in FIG. 4b as black squares (■). Also plotted as a dashed line a simple square root dependence for $\sigma_{norm}$:

$$\sigma_{norm} = \left(\sqrt{\frac{3\pi}{8} - 1}\right)\frac{1}{\sqrt{N+1}}$$

Naturally, for no hinges (a single-section emulator) the standard deviation $\sigma_{norm}$ is equal to that of a Maxwellian distribution, and for an infinite number of hinges it asymptotically approaches zero standard deviation σnorm is equal to that of a Maxwellian distribution, and for an infinite number of hinges it asymptotically approaches zero.

We have also computed the same quantity $\sigma_{norm}$ from five experimental data sets. The results are plotted vs. the putative number of hinges in FIG. 4b as open circles (○). We assume that the number of hinges was equal to the number of repeater sites with active thermal fluctuations, resulting in 3 hinges one of the data sets; 6 hinges for two other data sets; and 10 hinges for the two remaining data sets (two circles almost on top of each other in FIG. 4b). While the field results show the same trend as the numerical estimates, the numbers derived from the experimental data are somewhat smaller than those from the numerical data. We attribute the discrepancy to either a limited experimental frequency range or an ambiguity in number of hinges: it is possible that some bridges along the route acted as hinges as well, which could cause us to underestimate the number of hinges.

The effective number of hinges can be also determined from the statistics of time-average means of other PMD-dependent observables, such as length of the frequency resolved state of polarization trance, as described in detail in Boroditsky et al., in Proc. ECOC, 2004, vol. 3, pp. 306-309, Paper We1.4.1, which is incorporated herein by reference.

In addition to DGD, system outages depend on the signal launch conditions, modulation format, and details of the receiver. For the purpose of illustration, we define the outage probability of a given channel as a probability for a channel's instantaneous DGD to exceed a certain value acceptable to the system. Consequently, the outage probability is reduced to the area under the tail of the differential group delay probability density function (pdf). Taking into account the details of the receiver and the launch conditions does not change the quantitative results presented below, and described in detail in Kogelnik et al, IEEE Photon. Tech. Lett. vol. 17, pp. 1208-1210, June 2005, which is incorporated herein by reference.

Once the number of effectuive hinges in determined the following simulation procedure was used to study the statistics of outages among multiple channels and compliant capacity fraction in a system with a given rms DGD $\tau_{rms}$. We assume a system with $N_s$ 'frozen' fiber segments, connected by $N=N_s-1$ "hinges", that is polarization rotators (see FIG. 3). Each segment's DGD is assumed to have a Maxwellian distribution in frequency with $\tau_{rms}\sqrt{N_s}$. Without loss of generality, we can assume all frequencies of interest, or channels, to be statistically independent, that is separated by several frequency correlation bandwidths. This assumption will be justified in the discussion below. If so, an instantaneous DGD value for every channel and for every fiber segment can be drawn at random from a Maxwellian distribution. In this case, the pdf of DGD and outage probabilities for every channel can be computed efficiently using the analytical results for PMD emulators with fixed sections.

Figure 5:
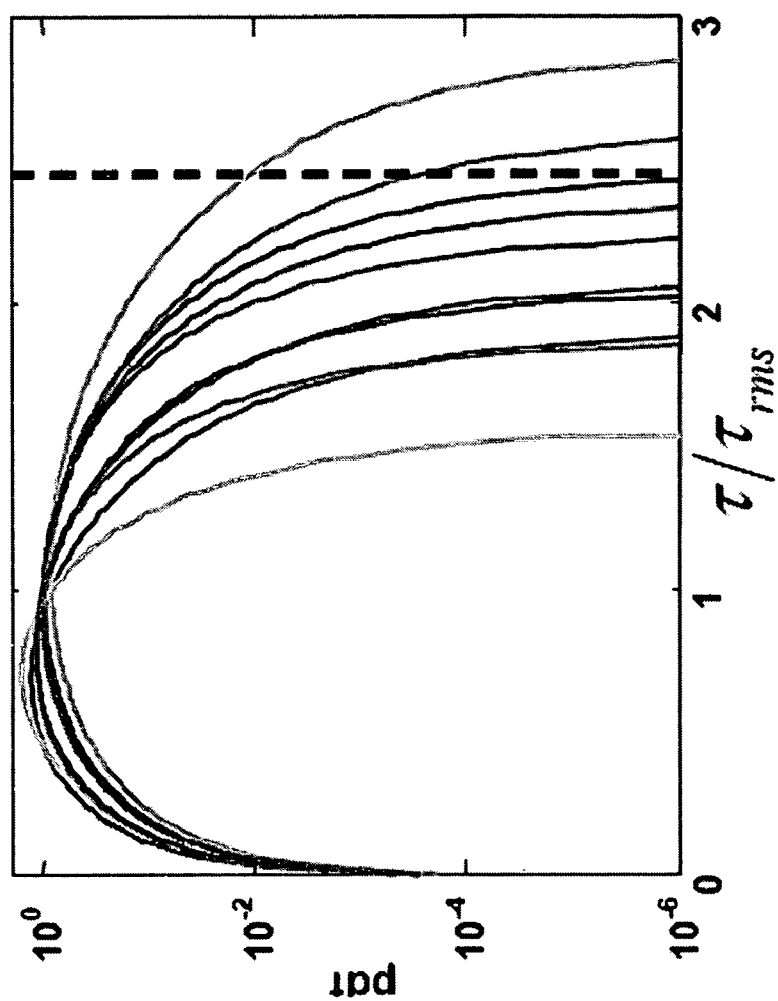
FIG. 5 is a graph of a probability density function for 10 statistically independent optical channels.

Referring now to FIG. 5 is an example depicting 10 different pdf's for 10 statistically independent channels in a fiber route consisting of 6 segments connected by 5 hinges. Clearly, the curves are significantly different. For a chosen outage value of, say $\tau_{max}$=2.5 $\tau_{rms}$, different channels will have a different outage probability, and for some of them it will be exactly zero (it would have taken ~$10^5$ pdf's to find an example exceeding the conventional choice of $\tau_{max}$=3 $\tau_{rms}$. This will occur if the sum of DGD's of all segments at this frequency is smaller than the maximum allowable DGD.

Let us address the assumption of the channel independence before discussing the results. The following consideration justifies using the statistics for outage probabilities: consider a 1000 km 10 Gb/s system with mean DGD of $\tau_{rms}$=10 ps consisting of 10 segments with mean PMD of $\tau_{rms}$~3 ps. Then the frequency correlation bandwidth in every segment is about $0.5/\tau_{rms}$~160 Ghz. This means, in turn, that there are tens of statistically independent channels in the L or C bands, with significantly different individual outage probabilities. In the following we use the term 'channel' to represent these statistically independent frequency bands. We have used 35000 realizations of the independent channels with the same ensemble mean PMD to determine the statistics of outages.

We apply the procedure devised above to compute the probability density functions of the outage probability. In this regard, the 'outage probability' is a measure of the channel reliability with respect to PMD. In a system with a finite number of polarization rotators, and non-Maxwellian PMD statistics, different channels will have different outage probabilities. The spread of the outage probabilities is what we are trying to characterize using their probability density functions. Certainly, these distributions will depend both on the threshold DGD, which defines an outage, and on the number of degrees of freedom, related to the number of hinges. In this simulation we assume that hinges are fully active, that is, they rotate isotropically through all $4\pi$ steradians.

Referring now to FIGS. 6a and 6b, probability density and cumulative probability are plotted, respectively, for the outage probabilities $P_{out}$ for a system with maximum tolerable DGD $\tau_{max}$=$3\tau_{rms}$, for differing numbers of hinges in a system (N=5, 10, 15). Given that the range of outage probabilities of interest covers several orders of magnitude, we plot the $P_{out}$ on the logarithmic scale. The fraction of channels that do not experience outage is represented by a delta-function at zero in FIG. 6a.

FIG. 6b shows the cumulative probability for a channel to operate with outage probability less than abscissa. Effectively, it is an integral of the functions plotted in FIG. 7a from 0 to the abscissa. Clearly, as the number of degrees of freedom increases, the system starts to behave like a Maxwellian system, and plots in FIG. 6b tend toward the step-like shape corresponding to the situation when all channels have identical Maxwellian statistics in time, and therefore the same outage probability, $2 \cdot 10^{-4}$ in this case. The same trend manifests itself in FIG. 6a in sharpening of the peak around $P_{out}$=$2 \cdot 10^{-4}$ and reduction of the delta-function at $P_{out}$=0 as number of hinges increases. Approaching from another direction, we can think of the reduction of degrees of freedom in a system as 'washing out' the step-function describing the outage probability. As a result, some channels have outage probability smaller, but some channels have an outage probability higher than expected from a Maxwellian distribution.

Figure 7B:
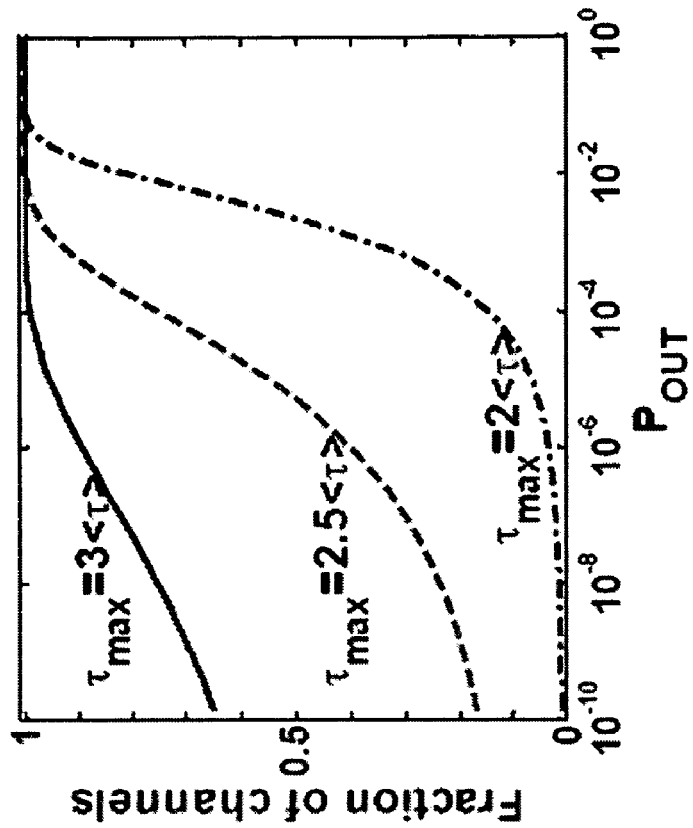
FIG. 7b is a graph illustrating outage probability vs. fraction of channels as a function of different numbers of hinges (cumulative probability)
Figure 7A:
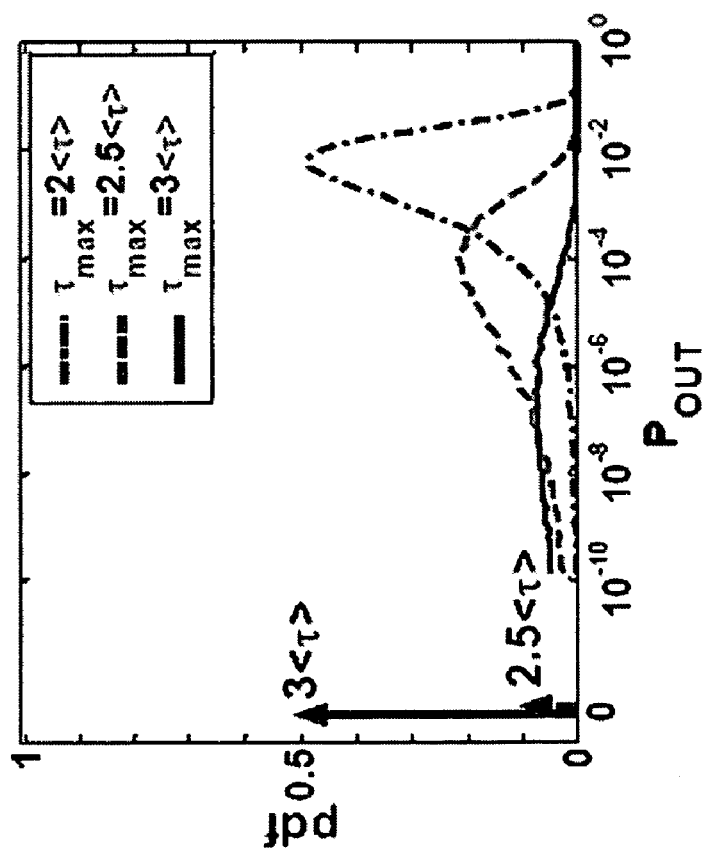
FIG. 7a is a graph depicting the distribution of the outage probability among optical channels in an optical system with 10 hinges for various values of maximum DGD.

It is also instructive to look at how the outage statistics change with system tolerance to PMD. In FIGS. 7a and 7b we compare the outage probability distribution for maximum allowed DGD $\tau_{max}$=$2\tau_{rms}$, $2.5\tau_{rms}$, $3\tau_{rms}$, with FIG. 7a depicting the distribution of the outage probability among channels in a system with ten hinges for various values of the maximum DGD, where arrows denote delta functions at 0, and correspond to the channels with zero outage probability, and FIG. 7b showing the fraction of channels with outage probability less than the abscissa. The first case of $\tau_{max}$=$2\tau_{rms}$, is the least PMD tolerant. Clearly, in the two latter cases some of the channels will be outage free.

Figure 8:
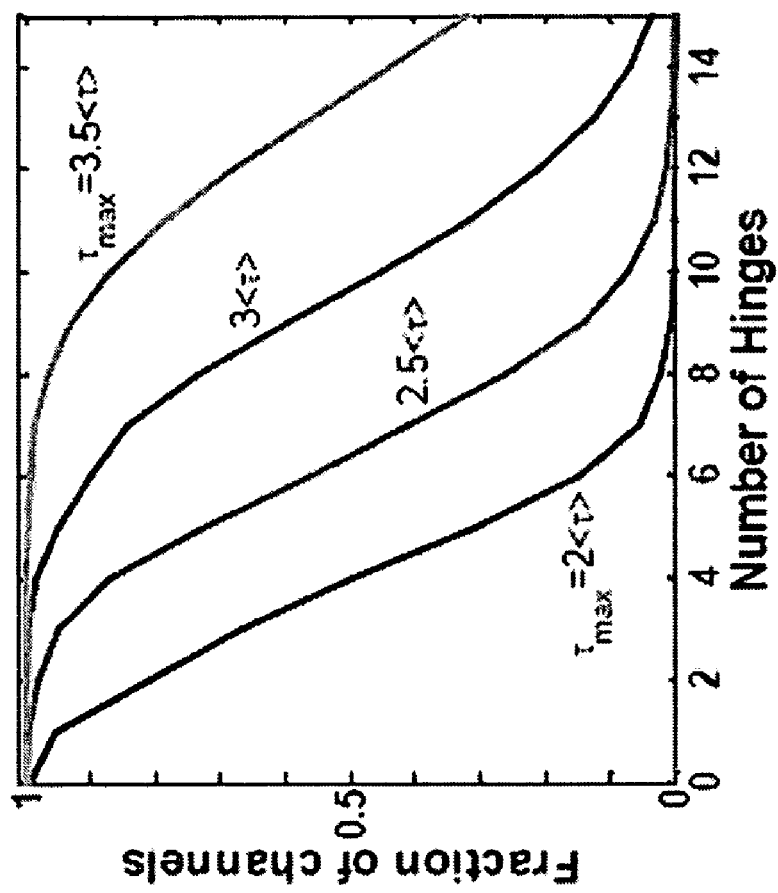
FIG. 8 is a graph depicting the outage-free channels as a function of the number of hinges for different values of maximum allowable DGD.

Finally we look at the fraction of the channels with outage probability exactly zero (i.e., channels with the sum of segments' DGD's less than the maximum tolerable DGD $\tau_{max}$). FIG. 8 is a plot of the fraction of the outage-free channels as a function of the number of hinges. For a system with small number of degrees of freedom, say N=5, even at a modest PMD tolerance of $\tau_{max}$=$2.5\tau_{rms}$, 75% of the channels are expected to be outage-free. The same fraction of channels will not experience PMD-related outage in a system with N=8 and $\tau_{max}$=$3\tau_{rms}$. Our results point to a different way to address the PMD problem. It is possible to show which channels are outage free by means of an in-service PMD monitoring technique utilizing an optical receiver and techniques described in, for example, M. Boroditsky, M. Brodsky, N. J. Frigo, P. Magill, L. Raddatz, "In-service measurements of polarization-mode dispersion and correlation to bit-error rate," IEEE Photon. Technol. Lett., 15(4) pp. 572-4, April 2003, the disclosure of which is incorporated by reference herein. Alternatively, in a multi-channel system a few unreliable channels may not be utilized at all. Increasing the tolerance towards PMD, say to $\tau_{max}$=$3\tau_{rms}$ will increase the fraction of outage-free channels for N=8 systems from 75% to 96%. Finally, since service level agreements are typically written in terms of the outage per month/year, artificially adding degrees of freedom (say, several slow polarization scramblers mid-span) won't solve the PMD problem but will force more predictable PMD dynamics closer to those described by a Maxwellian distribution over a desired timescale.

Figure 9:
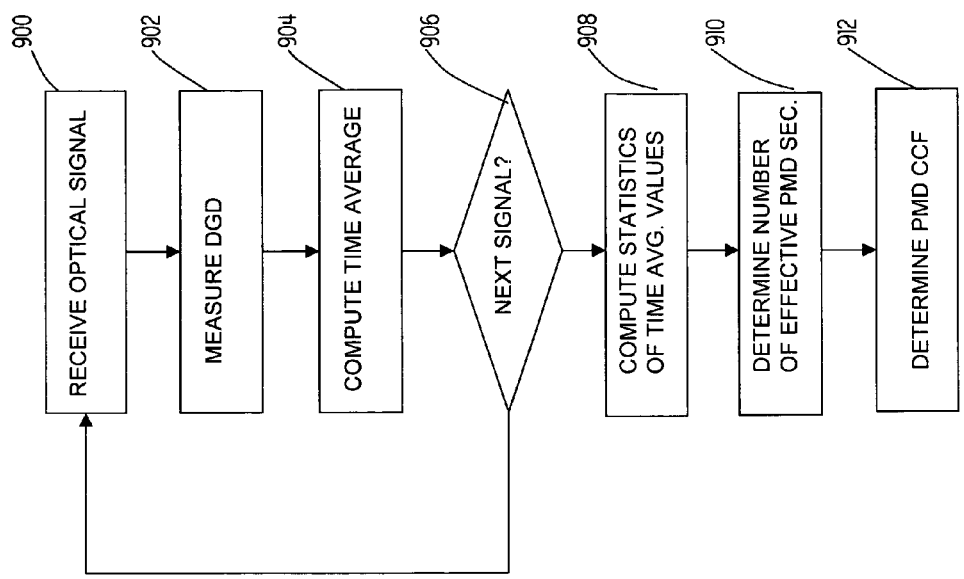
FIG. 9 is a flowchart of a method in accordance with an aspect of the invention.

Referring now to FIG. 9, there is depicted a flow diagram for practicing an aspect of the present invention. In block 900 a first optical signal corresponding to a first channel is selected from a predetermined set of optical signals received by an optical receiver through a common optical conduit. Next, in block 902, the DGD of the selected optical signal is monitored over time. While the exemplary technique measures the DGD received by an optical receiver, as discussed above, arty known or later developed technique directed to measuring DGD of the optical signal, or measuring the PMD of the optical signal can alternatively be used. In block 904, the time average of the monitored value of DGD is computed. This is repeated for each optical signal (channel) if there are multiple signals at decision block 906. The statistics of the time averaged values are then computed at block 908. The number of effective PMD sections in the system is then determined at block 910, and the size of the PMD CCF is determined at block 912 for any specified outage probability.

Figure 10:
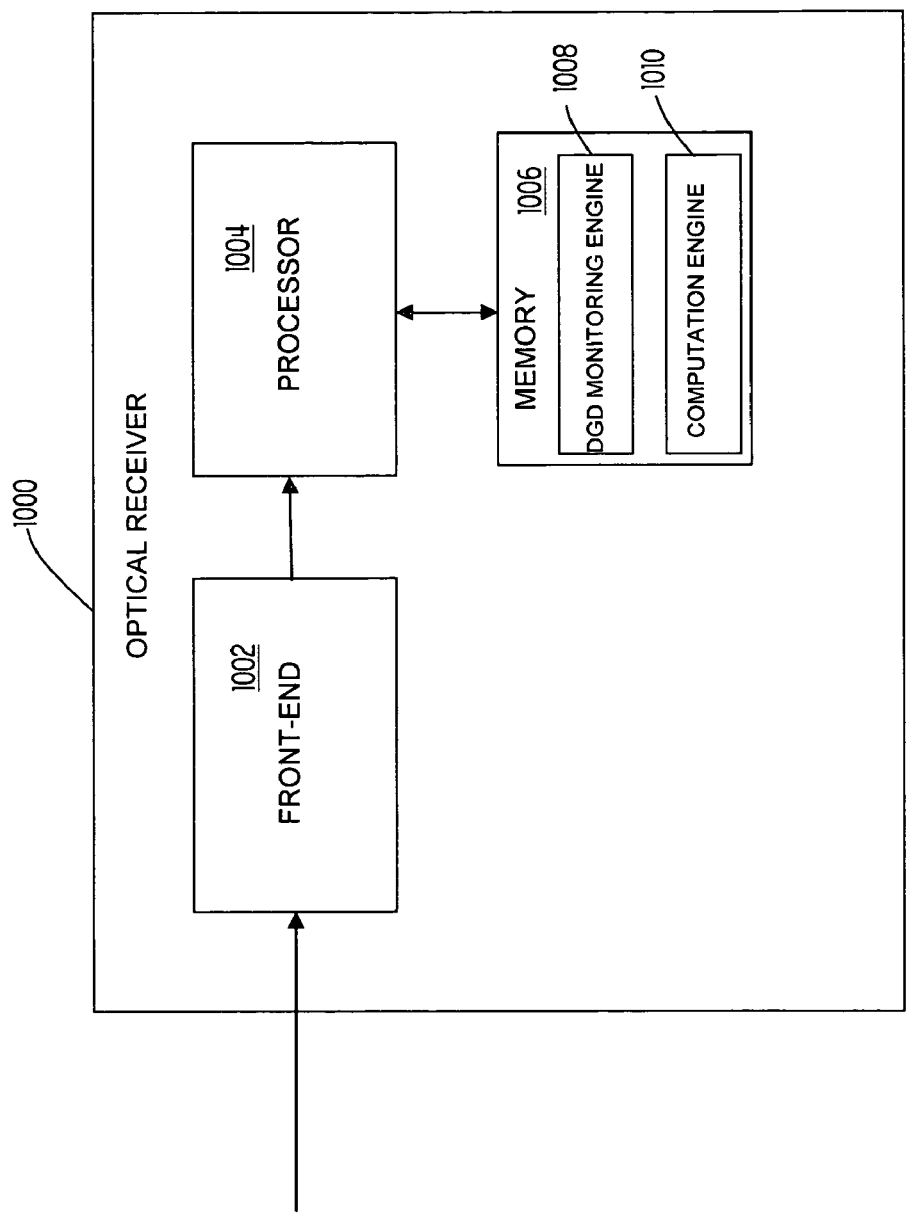
FIG. 10 is a block diagram of an optical receiver.

Referring now to FIG. 10, there is depicted a block diagram of an exemplary optical receiver 1000 for carrying out an aspect of the invention. The optical receiver 1000 includes a front end 1002 for receiving a plurality of optical signals that were propagated through a plurality of fiber segments as described above, a processor 1004 and memory 1006 coupled to processor 1004. The memory 1006 includes or is otherwise coupled to a DGD monitoring engine 1008 for monitoring DGD values for several optical frequencies over time, and a computation engine 1010 for computing a time average of the monitored DGD for each optical signal, computing statistics of the time averages of the monitored DGD for each optical signal, determining the number of effective PMD sections in the system from the statistics, and determining the size of a PMD CCF for a specified outage probability.

The present invention has been shown and described in what are considered to be the most practical and preferred embodiments. It is anticipated, however, that departures may be made therefrom and that obvious modifications will be implemented by those skilled in the art.

We claim:

1. A method for estimating a fraction of an optical transmission system's transmission window that is compliant with the system's polarization mode dispersion (PMD) outage specifications, the optical transmission system including $N_s$ optical fiber segments, comprising the steps of:

propagating a plurality of optical signals through the $N_s$ optical fiber segments;

monitoring the differential group delay (DGD) for each optical signal over time;

computing a time average and variance of the monitored DGD for each optical signal;

computing statistics of the time averages and variances of the monitored DGD for each optical signal;

determining the number of effective PMD sections and effective hinges in the system from the statistics; and determining the size of a PMD capacity compliant fraction for a specified outage probability.

2. The method recited in claim 1, further comprising the step of receiving the plurality of optical signals at an optical receiver and monitoring the DGD at the optical receiver.

3. The method recited in claim 2, further comprising the step of monitoring the PMD for each optical signal at the optical receiver.

4. An optical receiver for use in an optical system for estimating a fraction of the optical transmission system's transmission window that is compliant with the system's polarization mode dispersion (PMD) specifications, the optical transmission system including $N_s$ optical fiber segments, comprising:

a front end for receiving a plurality of optical signals that were propagated through the $N_s$ optical fiber segments; and a DGD monitoring engine for monitoring the differential group delay (DGD) for each optical signal over time;

a memory medium containing machine readable instructions which, when executed by a processor:

compute a time average of the monitored DGD for each optical signal;

compute statistics of the time averages of the monitored DGD for each optical signal;

determine the number of effective PMD sections in the system from the statistics; and determine the size of a PMD capacity compliant fraction for a specified outage probability.

* * * * *